(12) United States Patent
Sarkissian et al.

(10) Patent No.: US 11,796,644 B2
(45) Date of Patent: Oct. 24, 2023

(54) APPARATUS AND SYSTEM FOR A LIDAR ANTENNA

(71) Applicant: GM GLOBAL TECHNOLOGY OPERATIONS LLC, Detroit, MI (US)

(72) Inventors: Raymond Sarkissian, Studio City, CA (US); Keyvan Sayyah, Santa Monica, CA (US); Biqin Huang, Rancho Palos Verdes, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 645 days.

(21) Appl. No.: 16/814,587

(22) Filed: Mar. 10, 2020

(65) Prior Publication Data
US 2021/0124025 A1 Apr. 29, 2021

Related U.S. Application Data

(60) Provisional application No. 62/927,254, filed on Oct. 29, 2019.

(51) Int. Cl.
*G02F 1/295* (2006.01)
*G02B 6/12* (2006.01)
(Continued)

(52) U.S. Cl.
CPC .......... *G01S 7/4818* (2013.01); *G01S 7/4813* (2013.01); *G01S 7/4814* (2013.01); *G01S 7/4815* (2013.01);
(Continued)

(58) Field of Classification Search
CPC .... G01S 7/4818; G01S 7/4813; G01S 7/4814; G01S 7/4815; G01S 7/4816;
(Continued)

(56) References Cited

U.S. PATENT DOCUMENTS

| 8,121,450 B2 | 2/2012 | Webster et al. |
| 10,585,245 B1 * | 3/2020 | Bian ................ G02F 1/292 |

(Continued)

OTHER PUBLICATIONS

Jacques, Samani, El-Fiky, Patel, Xing, Plant; Optimization of thermo-optic phase-shifter design and mitigation of thermal crosstalk on the SOI platform; Optics Express 10456; vol. 27, No. 8; Apr. 15, 2019.
(Continued)

*Primary Examiner* — Kaveh C Kianni
*Assistant Examiner* — Hung Q Lam
(74) *Attorney, Agent, or Firm* — Quinn IP Law

(57) ABSTRACT

An apparatus including a light detection and ranging (Li-DAR) antenna of an optical phased array includes a silicon-on-insulator substrate including a silicon wire waveguide embedded within the substrate and a grating layer disposed over the substrate. The grating layer includes a silicon nitride layer coating the silicon-on-insulator substrate and including a plurality of etchings formed in a direction perpendicular to a longitudinal axis of the optical phased array and a silicon oxynitride layer coating the silicon nitride layer and filling the etchings. The etchings are relatively thin in the direction of the longitudinal axis of the optical phased array at a first end of the optical antenna and are relatively thick in the direction of the longitudinal axis at a second end. The etchings gradually increase in thickness between the first end of the optical phased array and the second end of the optical antenna.

19 Claims, 6 Drawing Sheets

(51) Int. Cl.
| | |
|---|---|
| *G02B 6/26* | (2006.01) |
| *G02B 6/42* | (2006.01) |
| *G02B 6/10* | (2006.01) |
| *G01S 7/481* | (2006.01) |
| *G01S 7/4911* | (2020.01) |
| *G01S 7/4912* | (2020.01) |
| *G01S 17/88* | (2006.01) |
| *G02B 6/122* | (2006.01) |
| *G01S 17/10* | (2020.01) |
| *G02F 1/095* | (2006.01) |
| *B60R 11/00* | (2006.01) |
| *G02F 1/01* | (2006.01) |

(52) U.S. Cl.
CPC .......... *G01S 7/4816* (2013.01); *G01S 7/4817* (2013.01); *G01S 7/4911* (2013.01); *G01S 7/4916* (2013.01); *G01S 17/10* (2013.01); *G01S 17/88* (2013.01); *G02B 6/12004* (2013.01); *G02B 6/1228* (2013.01); *G02F 1/0955* (2013.01); *B60R 11/00* (2013.01); *G02B 2006/1215* (2013.01); *G02B 2006/12061* (2013.01); *G02B 2006/12097* (2013.01); *G02B 2006/12121* (2013.01); *G02B 2006/12147* (2013.01); *G02F 1/0147* (2013.01)

(58) Field of Classification Search
CPC .... G01S 7/4817; G01S 7/4911; G01S 7/4916; G01S 17/10; G01S 17/88; G01S 17/34; G01S 7/4812; G02B 6/12004; G02B 6/1228; G02B 2006/12061; G02B 2006/12097; G02B 2006/12121; G02B 2006/12147; G02B 2006/1215; G02F 1/0955; G02F 1/0147; B60R 11/00

USPC .................. 385/10, 14, 15, 129–132; 356/4; 359/573

See application file for complete search history.

(56) References Cited

U.S. PATENT DOCUMENTS

| | | |
|---|---|---|
| 2013/0209033 A1 | 8/2013 | Luff et al. |
| 2018/0120433 A1 | 5/2018 | Eichenholz et al. |
| 2019/0018110 A1 | 1/2019 | Kremer et al. |
| 2019/0018114 A1 | 1/2019 | Patterson et al. |
| 2019/0018120 A1 | 1/2019 | Efimov et al. |
| 2019/0018139 A1 | 1/2019 | Sayyah et al. |
| 2019/0018198 A1 | 1/2019 | Sayyah et al. |
| 2019/0235053 A1 | 8/2019 | Spector |
| 2019/0302268 A1 | 10/2019 | Singer et al. |
| 2019/0302269 A1 | 10/2019 | Singer et al. |
| 2019/0391406 A1 | 12/2019 | Chen |
| 2020/0011994 A1 | 1/2020 | Thorpe et al. |
| 2020/0049801 A1 | 2/2020 | Sayyah et al. |
| 2021/0055460 A1* | 2/2021 | Lee ...................... G02B 6/0033 |
| 2022/0128661 A1* | 4/2022 | Wang ..................... G01S 17/86 |

OTHER PUBLICATIONS

Sacher, Mikkelsen, Huang, Mak, Yong, Luo, Li, Dumais, Jiang, Goodwill, Bernier, Lo, Poon; Monolithically Integrated Multilayer Silicon Nitride on-Silicon Waveguide Platforms for 3-D Photonic Circuits and Devices; IEEE vol. 106, No. 12; Dec. 2018.

Komljenovic, Bowers; Monolithically Integrated High-Q Rings for Narrow Linewidth Widely Tunable Lasers; IEEE vol. 51, No. 11; Nov. 2015.

\* cited by examiner

APPARATUS AND SYSTEM FOR A LIDAR ANTENNA

CROSS-REFERENCE TO RELATED APPLICATIONS

This application claims the benefit of U.S. Provisional Patent Application No. 62/927,254 filed on Oct. 29, 2019, the disclosure of which is hereby incorporated by reference.

INTRODUCTION

Light-detection and ranging (LiDAR) is an optical remote sensing technology that operates to acquire positional information of objects in a surrounding environment employing a light emitter and a light sensor. Operation of a LiDAR device includes illuminating objects in the surrounding environment with light emitted from a light emitter, detecting light scattered by the objects using a light sensor such as a photodiode, and determining range of the objects based on the scattered light. The travel time of the light to the photodiode may be measured, and a distance to an object may then be derived from the measured time. Detection and positional information related to objects in a surrounding environment may be enhanced by increased resolution of the LiDAR device.

A LiDAR device may employ light in the form of a pulse-modulated, frequency-modulated, or phase-modulated laser to measure ranges and other parameters of selected objects. It is advantageous to provide a LiDAR device that is lightweight, physically small and is capable of providing reliable measurements.

SUMMARY

An apparatus including a light detection and ranging (LiDAR) antenna of an optical phased array is provided. The apparatus includes an optical antenna, including a silicon-on-insulator substrate including a silicon wire waveguide embedded within the silicon-on-insulator substrate and a grating layer disposed over the silicon-on-insulator substrate. The grating layer includes a silicon nitride layer coating the silicon-on-insulator substrate and including a plurality of etchings formed in a direction perpendicular to a longitudinal axis of the optical phased array and a silicon oxynitride layer coating the silicon nitride layer and filling the etchings. The etchings are relatively thin in the direction of the longitudinal axis of the optical phased array at a first end of the optical antenna. The etchings are relatively thick in the direction of the longitudinal axis of the optical phased array at a second end of the optical antenna. The etchings gradually increase in thickness between the first end of the optical phased array and the second end of the optical antenna.

In some embodiments, the etchings include a constant period along the optical phased array.

In some embodiments, the optical phased array includes a length between 0.6 millimeters and 1.0 millimeters.

In some embodiments, the silicon wire waveguide includes a width in the direction perpendicular to the longitudinal axis of the optical phased array of between 450 nanometers and 1500 nanometers.

In some embodiments, the silicon wire waveguide includes tapers from a width in the direction perpendicular to the longitudinal axis of the optical phased array of 450 nanometers to a width in the direction perpendicular to the longitudinal axis of the optical phased array of 1500 nanometers.

According to one alternative embodiment, an apparatus including an optical phased array including a light detection and ranging (LiDAR) antenna is provided. The apparatus includes the optical phased array including an optical antenna. The optical antenna includes a silicon-on-insulator substrate including a silicon wire waveguide embedded within the silicon-on-insulator substrate and a grating layer disposed over the silicon-on-insulator substrate. The grating layer includes a silicon nitride layer coating the silicon-on-insulator substrate and including a plurality of rectangular etchings formed in a direction perpendicular to a longitudinal axis of the optical phased array. The grating layer further includes a silicon oxynitride layer coating the silicon nitride layer and filling the rectangular etchings. The rectangular etchings are relatively thin in the direction of the longitudinal axis of the optical phased array at a first end of the optical antenna. The rectangular etchings are relatively thick in the direction of the longitudinal axis of the optical phased array at a second end of the optical antenna. The rectangular etchings gradually increase in thickness between the first end of the optical phased array and the second end of the optical antenna.

In some embodiments, the optical phased array further includes a plurality of optical antennas.

In some embodiments, the rectangular etchings of the plurality of optical antennas are aligned.

In some embodiments, the rectangular etchings include a constant period along the optical phased array.

In some embodiments, a first portion of the plurality of optical antennas are operable as transmit optical antennas, and a second portion of the plurality of optical antennas are operable as receive optical antennas.

In some embodiments, the plurality of rectangular etchings includes trenches formed in the silicon nitride layer.

In some embodiments, the optical phased array includes a length between 0.6 millimeters and 1.0 millimeters.

In some embodiments, the silicon wire waveguide includes a width in the direction perpendicular to the longitudinal axis of the optical phased array of between 450 nanometers and 1500 nanometers.

In some embodiments, the silicon wire waveguide includes tapers from a width in the direction perpendicular to the longitudinal axis of the optical phased array of 450 nanometers to a width in the direction perpendicular to the longitudinal axis of the optical phased array of 1500 nanometers.

According to one alternative embodiment, a system including a light detection and ranging (LiDAR) system including an optical phased array including a LiDAR antenna is provided. The system includes a laser, a transmit optical splitter, an optical circulator, a photodetector, and an optical phased array including an optical antenna. the optical antenna includes a silicon-on-insulator substrate including a silicon wire waveguide embedded within the silicon-on-insulator substrate and a grating layer disposed over the silicon-on-insulator substrate. The grating layer includes a silicon nitride layer coating the silicon-on-insulator substrate and including a plurality of rectangular etchings formed in a direction perpendicular to a longitudinal axis of the optical phased array and a silicon oxynitride layer coating the silicon nitride layer and filling the rectangular etchings. The transmit optical splitter, the optical circulator, the photodetector, and the optical phased array are arranged as a chip-scale package on a single semiconductor device.

The laser generates a first light beam that is transmitted to an aperture of the optical phased array via the transmit optical splitter, the optical circulator, and the optical phased array. The first light beam is transmitted to the photodetector via the transmit optical splitter. The aperture of the optical phased array captures a second light beam that is transmitted to the photodetector via the optical phased array and the optical circulator. The rectangular etchings are relatively thin in the direction of the longitudinal axis of the optical phased array at a first end of the optical antenna. The rectangular etchings are relatively thick in the direction of the longitudinal axis of the optical phased array at a second end of the optical antenna. The rectangular etchings gradually increase in thickness between the first end of the optical phased array and the second end of the optical antenna.

In some embodiments, the optical phased array further includes a plurality of optical antennas, wherein the rectangular etchings of the plurality of optical antennas are aligned.

In some embodiments, the rectangular etchings include a constant period along the optical phased array.

In some embodiments, a first portion of the plurality of optical antennas are operable as transmit optical antennas, and a second portion of the plurality of optical antennas are operable as receive optical antennas.

In some embodiments, the silicon wire waveguide includes tapers from a width in the direction perpendicular to the longitudinal axis of the optical phased array of 450 nanometers to a width in the direction perpendicular to the longitudinal axis of the optical phased array of 1500 nanometers.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments may be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity, directional terms such as longitudinal, lateral, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As used herein, the term "system" may refer to one of or a combination of mechanical and electrical hardware, sensors, controllers, application-specific integrated circuits (ASIC), combinatorial logic circuits, software, firmware, and/or other components that are arranged to provide the described functionality. Angles provided herein are approximate and may include variance of approximately plus or minus 5%.

Figure 1:
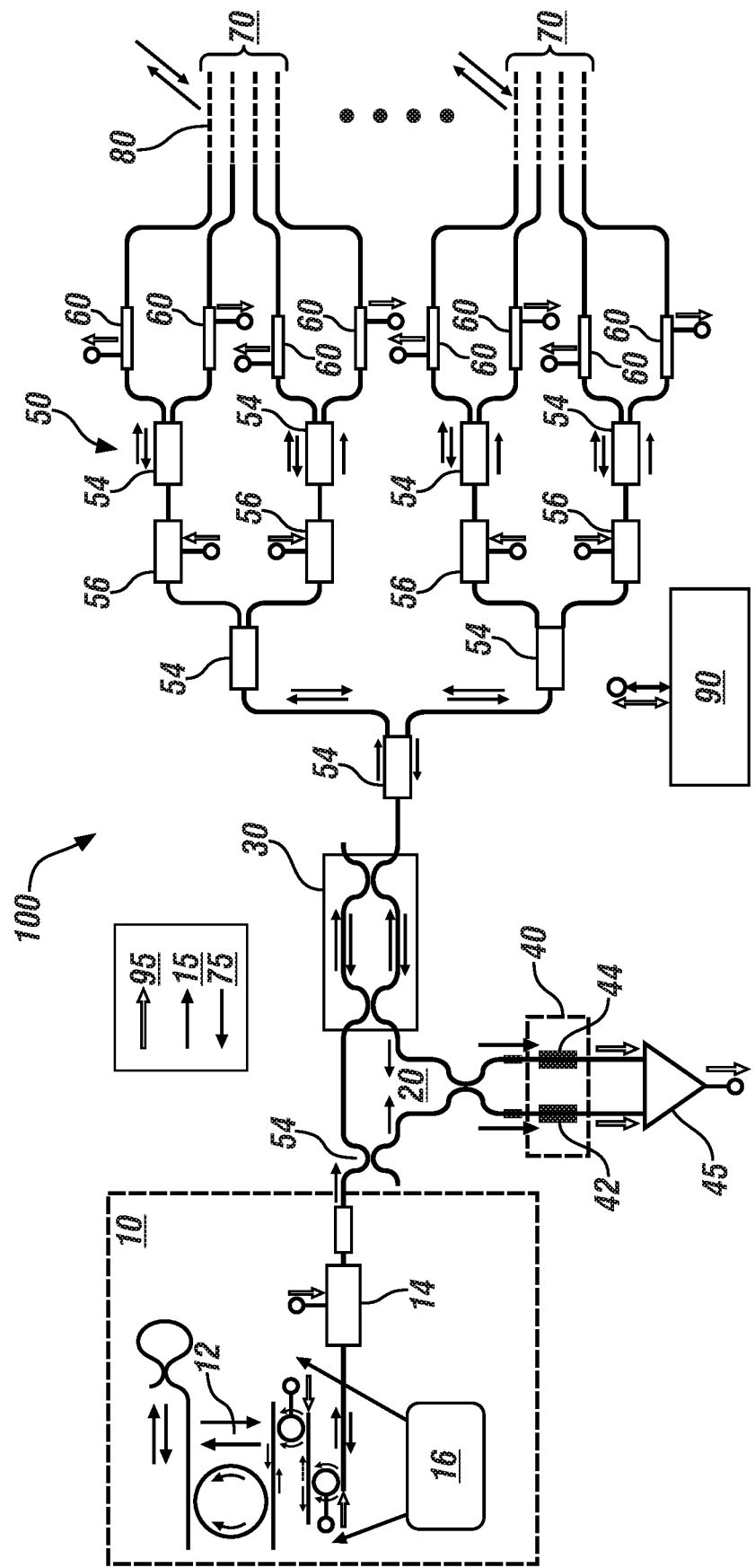
FIG. 1, schematically illustrates an embodiment of a light detection and ranging (LiDAR) device, in accordance with the disclosure.

Referring to the drawings, wherein like reference numerals correspond to like or similar components throughout the several Figures, FIG. 1, consistent with embodiments disclosed herein, schematically illustrates an embodiment of a LiDAR device 100. The LiDAR device 100 described herein is configured as a chip-scale optical phased array based frequency-modulated continuous wave (FMCW) LiDAR device with features that include a single transmit and receive optical phase array (OPA) aperture enabled by the integration of a chip-scale optical circulator. This configuration reduces the chip footprint as compared to other systems. The LiDAR device 100 includes an array of fully-integrated semiconductor optical amplifiers (SOA) that are distributed among the array elements resulting in a power-scalable LiDAR transmitter. The LiDAR device 100 also includes a widely tunable (~100 nm) fully-integrated narrow linewidth master laser, which enables wide angle scanning in the off-chip direction parallel to the OPA antennas. In an embodiment of this architecture, a mixed silicon (Si) and silicon nitride (SiN) integrated photonic platform is used enabling the co-integration of the narrow linewidth laser source together with active Si photonic components such as germanium on silicon (Ge-on-Si) photodiodes. Such a configuration may enable a mm-size OPA with mm-long optical antennas that enable transmit beams with very low divergence (<0.1°) with no free-space optics. Such a configuration may also enable implementation of a pseudo-random OPA, which results in LiDAR transmit beams with no grating lobes, hence reducing the complexity of FMCW beat signal detection and interpretation, and a compact (<1 cm$^2$) LiDAR sensor that may be enabled by the full integration of the laser, optical circulator and scanning mechanism in a single transmit/receive optical aperture implementation.

Referring again to FIG. 1, one embodiment of the LiDAR device 100 is schematically illustrated, including a laser 10, a transmit optical splitter 20, an optical circulator 30, a photodetector assembly 40, and an optical phased array 50. The laser 10, the transmit optical splitter 20, the optical circulator 30, the photodetector assembly 40, and the optical phased array 50 are arranged as a chip-scale package on a single semiconductor device. The laser 10 generates a transmitted light beam 15 that is transmitted to an aperture 80 of the optical phased array 50 via the transmit optical splitter 20, the optical circulator 30, and the optical phased array 50. The laser 10, the transmit optical splitter 20, the optical circulator 30, the optical phased array 50, and the aperture 80 are interconnected via optical waveguides. A controller 90 is arranged to monitor and control various elements of the LiDAR device 100, with electrical signals employed for communication with the controller 90. Electric signal current detection 95 is illustrated.

The transmitted light beam 15 is transmitted to the photodetector assembly 40 via transmit optical splitter 20 via optical waveguides. The aperture 80 of the optical phased array 50 captures a second, received light beam 75 that is transmitted to the photodetector assembly 40 via the optical phased array 50 and the optical circulator 30. The aperture 80 interconnects via the optical phased array 50 to the photodetector assembly 40 via optical waveguides.

The LiDAR device 100 is arranged as a chip-scale package. A chip-scale package (CSP) is an integrated circuit package that includes surface-mount technology, and whose surface area is not more than 1.2 times an original die area. There are many benefits associated with chip-scale packages. Size reduction of the package compared to traditional packages is enabled due to ball grid array design of the package, which increases the number of interconnects. Another advantage associated with chip-scale packages is self-alignment characteristics and the lack of bent leads, features which further help in lowering the manufacturing time and steps.

The laser 10 is a widely tunable (~100 nm) fully-integrated narrow linewidth master laser 10, and in one embodiment is configured as a scanning frequency modulated continuous wave (FMCW) LiDAR device. The laser 10 includes a tunable high-Q laser resonator 12, a tunable laser controller 16, and a semiconductor gain chip 14, which feeds via a 1×2 splitter 54 into the optical circulator 30 and the photodetector assembly 40. The tunable high-Q laser resonator 12 includes, in one embodiment, a micro-ring or a waveguide grating-based high quality factor (Q) integrated optical resonator.

The photodetector assembly 40 is arranged to include a photodetector 42 and a photodetector 44, arranged as a balanced detection unit, both of which are connected to a trans-impedance amplifier 45.

The trans-impedance amplifier 45 is in communication with the photodetector 42 and the photodetector 44 and generates an output signal that is communicated to the controller 90.

The transmit optical splitter 20 directs the transmitted light beam 15 generated by the laser 10 to the optical phased array 50 via the optical circulator 30 and directs the transmitted light beam 15 generated by the laser 10 to the photodetector assembly 40.

The optical circulator 30 is configured as an integrated photonic component that separates optical signals that travel in opposite directions in an integrated photonic circuit, i.e., an optical waveguide. The optical circulator 30 is a three- or four-port optical device designed such that light entering any port exits from the adjacent port. Optical circulators are used to separate optical signals that travel in opposite directions in an integrated photonic waveguide, for example to achieve bi-directional transmission over a single aperture. The optical circulator 30 may include an integrated optical circulator 30 that includes an unbalanced Mach-Zehnder or micro-ring resonator based optical circulator 30 that is integrated with a magneto-optical material. The wavelength of the integrated optical circulator 30 is tunable using an electro-optic or a thermo-optic effect.

The optical phased array 50 captures the second, received light beam 75 that is transmitted to the optical circulator 30, and the optical circulator 30 directs the received light beam 75 to the photodetector assembly 40. In one embodiment, the optical phased array 50 may be configured as an integrated two-dimensional optical phased array (OPA) with a fully integrated beam-steering photonic integrated circuit (PIC). Phased-array optics is the technology of controlling the phase and amplitude of light waves transmitting, reflecting, or received by a two-dimensional surface using adjustable surface elements. An optical phased array (OPA) is the optical analog of a radio wave phased array. By dynamically controlling the optical properties of a surface on a microscopic scale, the light beams are steered into an OPA transmitter, or the view direction of sensors in an OPA receiver, without moving parts. Phased array beam steering is used for optical switching and multiplexing in optoelectronic devices, and for aiming laser beams. The PIC facilitates integrating, for example, lasers, modulators, detectors, and filters on a single semiconductor, typically silicon or indium phosphide.

The optical phased array 50 includes a plurality of 1×2 optical splitters 54, a plurality of semiconductor optical amplifiers 56, a plurality of phase shifters 60, a plurality of optical antennas 70, and the aperture 80, all of which are interconnected by optical waveguides. The aperture 80 is arranged as a single transmit and receive aperture.

The optical phase array 50 is configured as follows in this embodiment. A first of the 1×2 optical splitters 54 interconnects with the optical circulator 30, and is connected in series with a pair of the 1×2 optical splitters 54 and arranged in a cascaded configuration. The outputs of the pairs of the 1×2 optical splitters 54 are each connected to one of the semiconductor optical amplifiers 56, which are connected to a second set of the 1×2 optical splitters 54, each of which feeds into one of a plurality of phase shifters 60, which lead into respective optical antennas 70. The semiconductor optical amplifiers 56 and the phase shifters 60 communicate with and are controlled by the controller 90.

The plurality of optical antennas 70 are one mm-long optical antennas that include grating couplers with engineered near-field emission patterns. Each of the plurality of optical antennas 70 operates as a transmit antenna and as a receive antenna.

The semiconductor optical amplifiers (SOA) 56 of the optical phased array 50 are arranged to generate a power-scalable optical phased array. The SOAs 56 of the optical phased array 50 are controllable to vary signal intensity of the transmitted light beam 15 that is generated by the laser 10. The SOAs 56 of the optical phased array 50 are controllable to vary signal intensity of the received light beam 75.

The plurality of optical antennas 70 of the optical phased array 50 are fed coherent signals having intensities that vary based upon the SOAs 56.

The laser 10, the transmit optical splitter 20, the optical circulator 30, the photodetector assembly 40, and the optical phased array 50 are arranged on a single semiconductor device. This includes the laser 10, the transmit optical splitter 20, the optical circulator 30, the photodetector assembly 40, and the optical phased array 50 being arranged on a silicon integrated photonic platform that is fabricated from mixed silicon and silicon nitride in one embodiment. A feedback circuit provides for wavelength control and stabilization.

Figure 2:
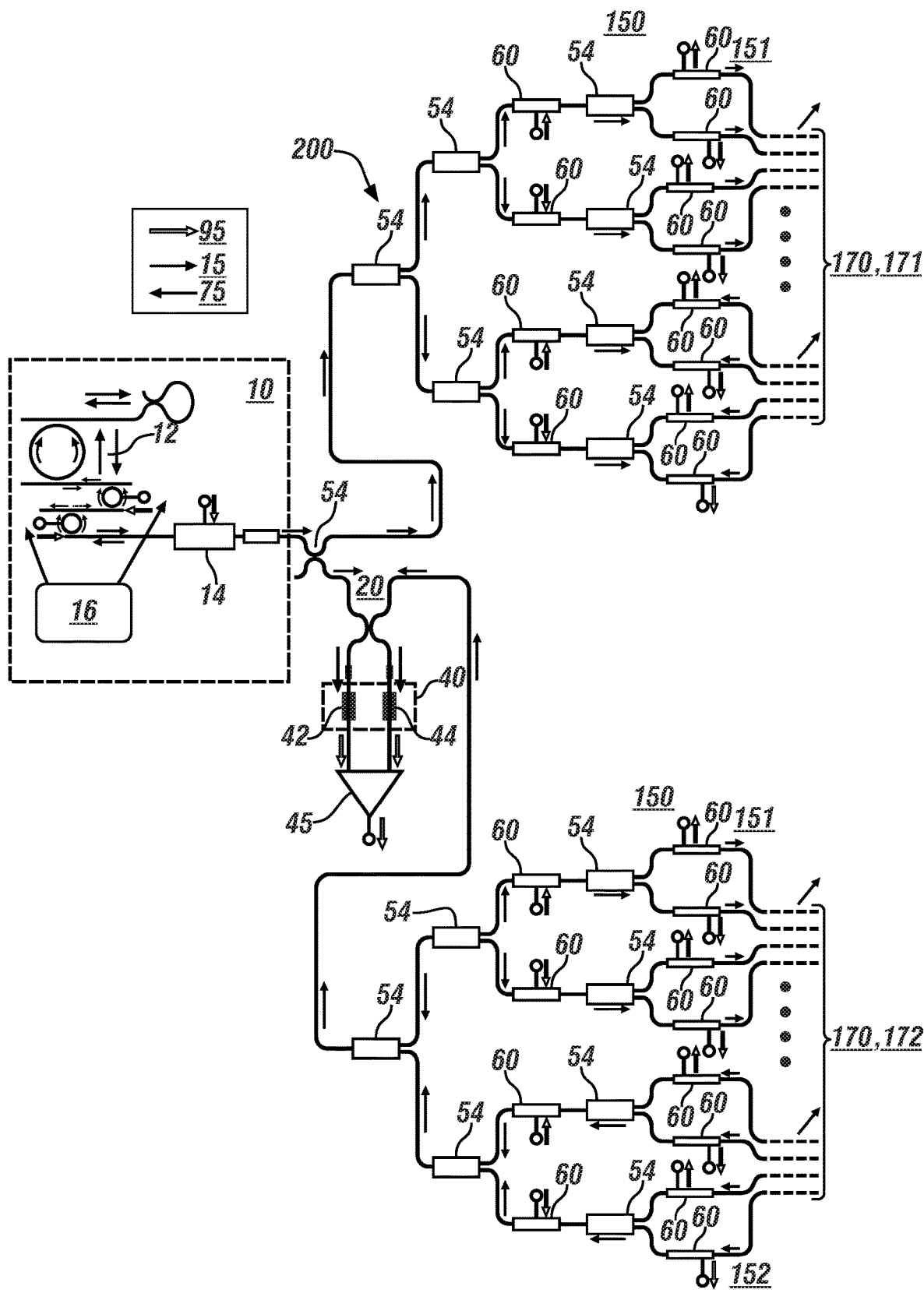
FIG. 2 schematically illustrates another embodiment of a LiDAR device, in accordance with the disclosure.

FIG. 2 schematically illustrates a second embodiment of the LiDAR device 200, which is analogous to the LiDAR device 100 illustrated with reference to FIG. 1. The LiDAR device 200 described herein is configured as a chip-scale optical phased array based frequency-modulated continuous wave (FMCW) LiDAR device with features that include a transmit and receive optical phase array (OPA) having a dual aperture for transmitting and receiving.

The LiDAR device 200 includes laser 10, transmit optical splitter 20, photodetector assembly 40, and a dual-aperture optical phased array 150. The dual-aperture optical phased array 150 is configured to include a transmit optical phased array 151 and a receive optical phased array 152.

The laser 10, the transmit optical splitter 20, the photodetector assembly 40, and the dual-aperture optical phased array 150 are arranged as a chip-scale package on a single semiconductor device. The laser 10 generates a transmitted light beam 15 that is transmitted to a transmit aperture of the optical phased array 50 via the transmit optical splitter 20, and the transmit optical phased array 151. The laser 10, the transmit optical splitter 20, the transmit optical phased array 151, and the transmit aperture are interconnected via optical waveguides. A controller 90 is arranged to monitor and control various elements of the LiDAR device 100, with electrical signals employed for communication with the controller 90. Electric signal current detection 95 is illustrated.

The transmitted light beam 15 is transmitted to the photodetector assembly 40 via transmit optical splitter 20, which are interconnected via optical waveguides.

A receive aperture of the optical phased array 50 captures the second, received light beam 75 that is transmitted to the photodetector assembly 40 via the receive optical phased array 152. An aperture interconnects via the optical phased array 50 to the photodetector assembly 40 via optical waveguides.

The LiDAR device 100 is arranged as a chip-scale package. A chip-scale package (CSP) is an integrated circuit package that includes surface-mount technology, and whose surface area is not more than 1.2 times an original die area. There are many benefits associated with chip-scale packages. Size reduction of the package compared to traditional packages is enabled due to ball grid array design of the package, which increases the number of interconnects. Another advantage associated with chip-scale packages is self-alignment characteristics and the lack of bent leads, features which further help in lowering the manufacturing time and steps.

The laser 10 is a widely tunable (~100 nm) fully-integrated narrow linewidth master laser 10, and in one embodiment is configured as a scanning frequency modulated continuous wave (FMCW) LiDAR device. The laser 10 includes a tunable high-Q laser resonator 12, a tunable laser controller 16, and a semiconductor gain chip 14, which feeds via a 1×2 splitter 54 into the photodetector assembly 40. The tunable high-Q laser resonator 12 includes, in one embodiment, a micro-ring or a waveguide grating-based high quality factor (Q) integrated optical resonator. The photodetector assembly 40 is arranged to include a transmit photodetector 42 and a receive photodetector 44, both of which are connected to a transmit photodetector 42 and a trans-impedance amplifier 45. The trans-impedance amplifier 45 is in communication with the transmit photodetector 42 and the receive photodetector 44, and generates an output signal that is communicated to the controller 90. The transmit optical splitter 20 directs the transmitted light beam 15 generated by the laser 10 to the optical phased array 50, and directs the transmitted light beam 15 generated by the laser 10 to the transmit photodetector 42.

The transmit optical phased array 151 and the receive optical phased array 152 of the optical phased array 150 each includes a plurality of 1×2 optical splitters 54, a plurality of semiconductor optical amplifiers 56, and a plurality of phase shifters 60. The transmit optical phased array 151 includes a plurality of transmit optical antennas 171 coupled to the first, transmit aperture, and the receive optical phased array 152 includes a plurality of receive optical antennas 172 that are coupled to the second, receive aperture.

The transmit optical phase array 151 is configured as follows in this embodiment. A first of the 1×2 optical splitters 54 interconnects with the optical circulator 30, and is connected in series with a pair of the 1×2 optical splitters 54 and arranged in a cascaded configuration. The outputs of the pairs of the 1×2 optical splitters 54 are each connected to one of the semiconductor optical amplifiers 56, which are connected to a second set of the 1×2 optical splitters 54, each of which feeds into one of a plurality of phase shifters 60, which lead into respective transmit optical antennas 171. The semiconductor optical amplifiers 56 and the phase shifters 60 communicate with and are controlled by the controller 90.

The receive optical phase array 152 is configured as follows in this embodiment. A first of the 1×2 optical splitters 54 interconnects with the optical circulator 30, and is connected in series with a pair of the 1×2 optical splitters 54 and arranged in a cascaded configuration. The outputs of the pairs of the 1×2 optical splitters 54 are each connected to one of the semiconductor optical amplifiers 56, which are connected to a second set of the 1×2 optical splitters 54, each which feeds into one of a plurality of phase shifters 60, which lead into respective receive optical antennas 172. The semiconductor optical amplifiers 56 and the phase shifters 60 communicate with and are controlled by the controller 90. The plurality of optical antennas 170 are one mm-long optical antennas that include grating couplers with uniform near-field emission patterns.

The laser 10, the transmit optical splitter 20, the optical circulator 30, the photodetector assembly 40, and the optical phased array 50 are arranged on a single semiconductor device. This includes the laser 10, the transmit optical splitter 20, the photodetector assembly 40, and the optical phased array 150 being arranged on a silicon integrated photonic platform that is fabricated from mixed silicon and silicon nitride in one embodiment, with a feedback circuit providing for wavelength control and stabilization.

Figure 3:
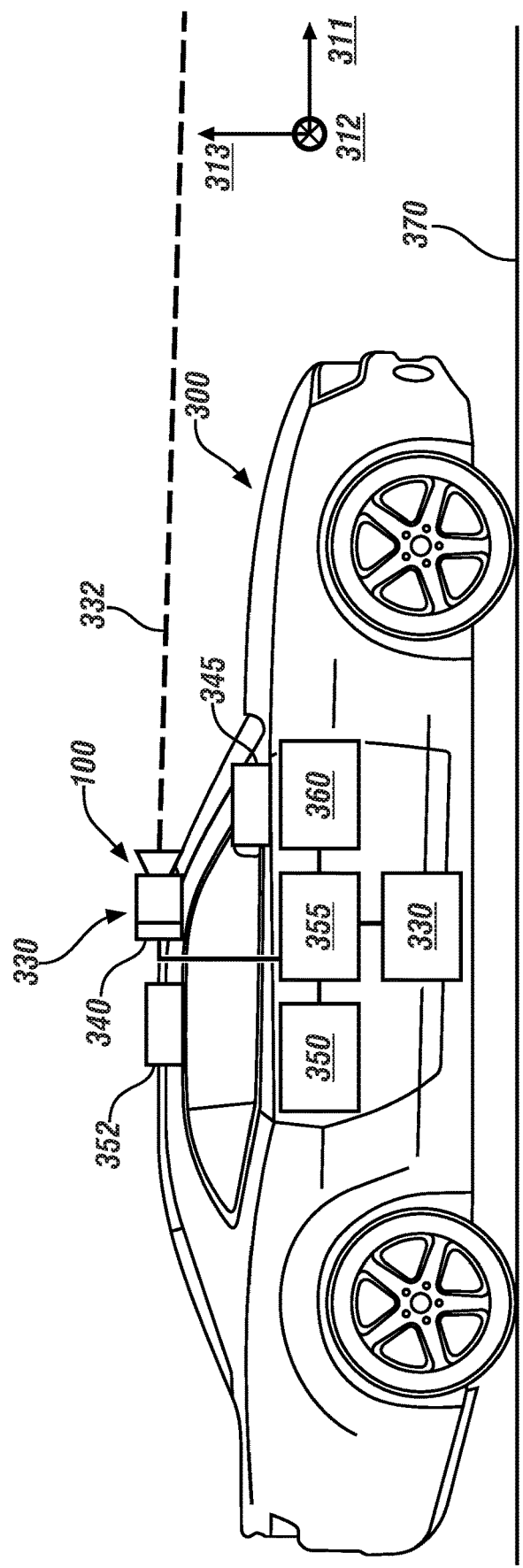
FIG. 3, schematically illustrates an embodiment of a LiDAR device, wherein the LiDAR sensor is an element of a spatial monitoring system that is disposed on a vehicle to monitor a field of view, in accordance with the disclosure.

FIG. 3 schematically illustrates a vehicle 300 that employs a LiDAR system 330 that includes either an embodiment of the LiDAR device 100 that is described with reference to FIG. 1 (as shown), or an embodiment of the LiDAR device 200 that is described with reference to FIG. 2. In one embodiment, and as described herein, the LiDAR system 330 is an element of a spatial monitoring system 340 including a spatial monitoring controller 355 that is disposed on the vehicle 300. The concepts described herein may be employed on various systems that may benefit from information determined from an embodiment of the LiDAR system 330.

A side-view of the vehicle 300 is shown, which is disposed on and able to traverse a travel surface 370 such as a paved road surface. The vehicle 300 and the travel surface 370 define a three-dimensional coordinate system including a longitudinal axis 311, a lateral axis 312 and an attitudinal axis 313. The longitudinal axis 311 is defined as being equivalent to a direction of travel of the vehicle 300 on the travel surface 370. The lateral axis 312 is defined as being equivalent to orthogonal to the direction of travel of the vehicle 300 on the travel surface 370. The attitudinal axis 313 is defined as being orthogonal to a plane defined by the longitudinal axis 311 and the lateral axis 312, i.e., as projecting perpendicular to the travel surface 370.

The LiDAR system 330 is disposed on the vehicle 300 to monitor a viewable region 332 that is proximal to the vehicle 300. In one embodiment, the viewable region 332 is forward of the vehicle 300. The vehicle 300 may also include a vehicle controller 350, a global navigation satellite system (GNSS) sensor 352, and a human/machine interface (HMI) device 360. The LiDAR system 330 employs a pulsed and reflected laser beam to measure range or distance to an object. When employed in combination with information from the GNSS sensor 352, a spatial monitoring controller 355 is able to determine geospatial locations of objects that are in the viewable region 332 of the vehicle 300.

Other on-vehicle systems may include, by way of non-limiting examples, an on-board navigation system, a computer-readable storage device or media (memory) that includes a digitized roadway map, an autonomous control system, an advanced driver assistance system, a telematics controller, etc. The vehicle 300 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

A spatial monitoring system 340 may include other spatial sensors and systems that are arranged to monitor the viewable region 332 forward of the vehicle 300 including, e.g., a surround-view camera, a forward-view camera 345, and a radar sensor, which may be employed to supplement or complement spatial information that is generated by the LiDAR system 330. Each of the spatial sensors is disposed on-vehicle to monitor all or a portion of the viewable region 332 to detect proximate remote objects such as road features, lane markers, buildings, pedestrians, road signs, traffic control lights and signs, other vehicles, and geographic features that are proximal to the vehicle 300. The spatial monitoring controller 355 generates digital representations of the viewable region 332 based upon data inputs from the spatial sensors. The spatial monitoring controller 355 may evaluate inputs from the spatial sensors to determine a linear range, relative speed, and trajectory of the vehicle 300 in view of each proximate remote object. The spatial sensors may be located at various locations on the vehicle 300, including the front corners, rear corners, rear sides and mid-sides. The spatial sensors may include a front radar sensor and a camera in one embodiment, although the disclosure is not so limited. Placement of the spatial sensors permits the spatial monitoring controller 355 to monitor traffic flow including proximate vehicles, intersections, lane markers, and other objects around the vehicle 300. Data generated by the spatial monitoring controller 355 may be employed by a lane marker detection processor (not shown) to estimate the roadway. As employed herein, the terms "proximate", "proximal" and related terms refer to stationary and mobile objects that are in the vicinity of the vehicle 300 such that they are discernible by one or more of the spatial sensors connected to the spatial monitoring controller 355 including the LiDAR system 330.

Optical antennas 70 and optical antennas 170 may include a plurality of integrated silicon photonic antennas. The integrated silicon photonic antennas described herein may achieve beyond 80% efficiency and include a physical package size or footprint of about 1 mm in a longitudinal direction. Highly efficient silicon photonic antennas that are a millimeter or longer in length are advantageous for applications such as LiDAR where the antennas may be implemented in an optical phase array for beam steering devoid of free-space optics. Grating outcouplers have been shown to achieve high efficiency but over smaller grating lengths of several tens of micrometers. Additionally, it is advantageous to minimize the reflections back into the waveguide mode as these elements maybe used in conjunction with an integrated laser source. The antenna proposed here takes advantage of multilayer cladding structure where the grating is fabricated, while the waveguiding is done via the waveguide underneath that has been adiabatically tapered from its original dimension to maximize the interaction volume with the grating above. The grating in the cladding is further apodized to reduce the reflection and allow for the light to slowly outcouple until it is nearly fully scattered over the length of the grating. The antenna is made by silicon wire waveguide that is adiabatically tapered from a typical width of 450 nm to 1500 nm. The bottom cladding may be silicon dioxide ($SiO_2$) while the upper cladding is comprised of two layers. The first layer is Si-rich SiN, where the grating is fabricated by etching. The second layer is a silicon oxynitride (SiON) capping layer that is blanket deposited and convers the openings etched into underlying SiN layer. An outcoupling efficiency of about 88% is simulated for this antenna that has a mere 0.3% reflection over the entire one mm length of the grating. The outcoupling angle is about 52 degrees.

According to one embodiment, the optical antenna 70 includes an integrated silicon photonic antenna including a waveguide layer made of a silicon strip waveguide that is tapered to a wider width waveguide from about 450 to about 1500 nanometers with a silicon dioxide bottom cladding layer. A grating layer is provided of silicon-rich silicon nitride that is directly deposited over the waveguide and is nominally 500 nm in thickness measured from the base of the waveguide. An apodized grating is etched into the silicon nitride layer above with a trench depth of 150 nanometers, trench final opening of 500 nanometers, and a period of 1020 nanometers. A 3000 nm thick silicon oxynitride blanket capping layer is positioned directly on top of the grating layer. The optical antenna is optimized for larger outcoupling angles to minimize reflection and maximize overall antenna efficiency.

In one embodiment, materials of the upper cladding layers may be selected or altered to fit a particular application depending on the overall efficiency or outcoupling angle needed. In one embodiment, the final taper width of the waveguide may be chosen for balancing efficiency versus antenna array spacing for OPA applications.

Figure 4:
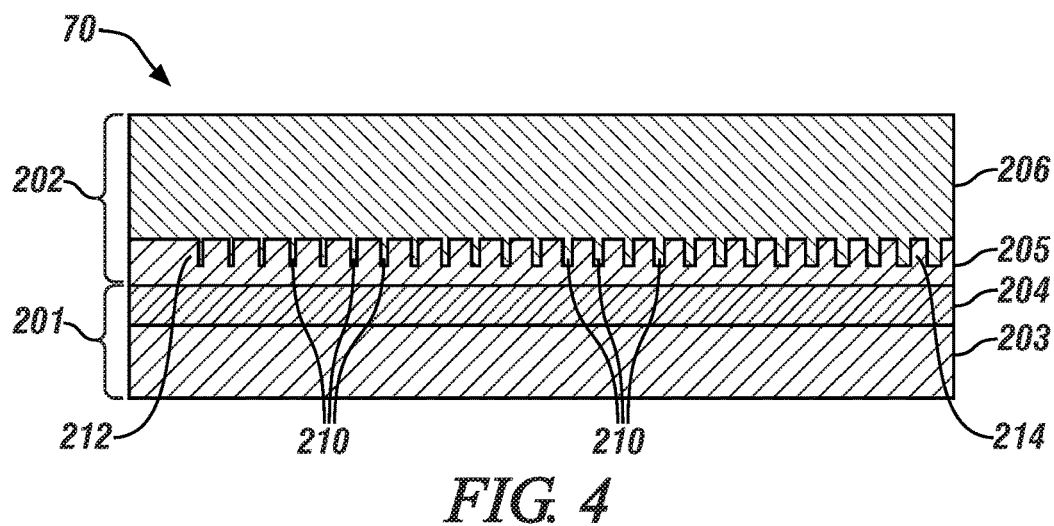
FIG. 4 schematically illustrates in side cross-sectional view an optical antenna, in accordance with the disclosure.

FIG. 4 schematically illustrates in side cross-sectional view an optical antenna 70. According to one exemplary embodiment, the optical antenna 70 may be approximately 0.6 mm or less to 1.0 mm or more in length or longitudinally (on the order of 1 mm in length.) According to one exemplary embodiment, the optical antenna 70 may be approximately 3,600 nanometers thick or tall (or approximately 0.0036 mm thick.) The optical antenna 70 may include a thickness an order of magnitude smaller than it is long. In FIG. 4, the thickness is exaggerated for purposes of illustration. The length of the optical antenna 70 is illustrated horizontally. The thickness of the optical antenna 70 is illustrated vertically. In one embodiment, a silicon on insulator (SOI) wafer 201 may be used to construct the antennas. In one example, a silicon dioxide layer 203 may be provided and include a silicon wire waveguide 204 embedded within the silicon dioxide layer 203. A top layer or grating layer 202 is provided upon wafer 201 and includes a silicon nitride layer 205 and a silicon oxynitride layer 206. The silicon nitride layer 205 includes a plurality of etchings 210 that are formed or cut into the surface of silicon nitride layer 205. Etchings 210 may be rectangular in cross section. Material from the silicon oxynitride layer 206 fills the etchings 210. Etchings 210, at a first end 212 of optical antenna 70, are relatively thin in the longitudinal direction, and etchings 210, at a second end 214 of optical antenna 70, are relatively thick in the longitudinal direction. The longitudinal thickness of the etchings 210 gradually increase along the length of the optical antenna 70. The first end 212 is attached to waveguides of the rest of the OPA.

In one embodiment, the silicon dioxide layer 203 may be approximately 2,220 nanometers in total thickness, with the silicon wire waveguide 204 embedded within that total thickness. As a result, as illustrated in FIG. 4, the silicon wire waveguide 204 may be 220 nanometers thick and the portion of the silicon dioxide layer 203 below the silicon wire waveguide 204 may be 2,000 nanometers thick. In one embodiment, silicon nitride layer 205, in portions without the etchings 210 cut into the surface, may be approximately 380 nanometers thick, while the silicon oxynitride layer 206 in portions not next to the etchings 210, may be 3,000 nanometers thick. Such exemplary thicknesses of the silicon nitride layer 205 and the silicon oxynitride layer 206 result in the top layer including a total thickness of 3,380 nanometers.

The optical antenna 70 uses etched trenches in the silicon nitride layer 205. Etched trenches may be advantageous in some aspects as compared to scatter-boxes used in the art. Use of etched trenches enables the trenches to be blanket deposited of the silicon nitride layer 205, which helps with capture of light from the waveguide underneath while the gratings that are etched into the silicon nitride layer 205 outcouple the light into the free space. The width of these trenches or etchings are varied in such a way that it pushes the onset of peak outcoupling further away from the starting edge of the antenna 70 while making sure that the outcoupling happens along the entire length of the antenna 70 following a weak exponential decay. This very fact helps with low reflection and enables efficient outcoupling over longer antenna lengths, e.g. 600 nm or 1000 nm.

Figure 5:
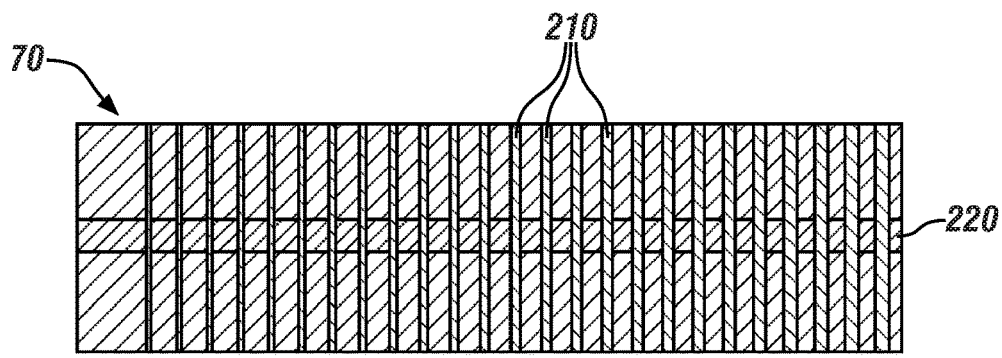
FIG. 5 schematically illustrates the optical antenna of FIG. 4 in a top view, in accordance with the disclosure.

FIG. 5 schematically illustrates the optical antenna 70 of FIG. 4 in a top view. The optical antenna 70 includes the plurality of etchings 210 formed as straight channels perpendicular to the longitudinal length of the optical antenna 70. The longitudinal thickness of the etchings 210 gradually increase along the length of the optical antenna 70. In one embodiment, the period of the etchings 210 is constant, with centerlines of each of the etchings 210 being equidistant from neighboring etchings 210. The silicon wire waveguide 204 is illustrated in a central portion of optical antenna 70. In one embodiment, silicon wire waveguide may include an exemplary width of 450 to 1500 nanometers in the vertical direction of FIG. 5. The silicon wire waveguide 204 extends in a longitudinal direction of the antenna 70, and the etchings 210 extend in a perpendicular direction to the longitudinal direction of the antenna 70.

Figure 6:
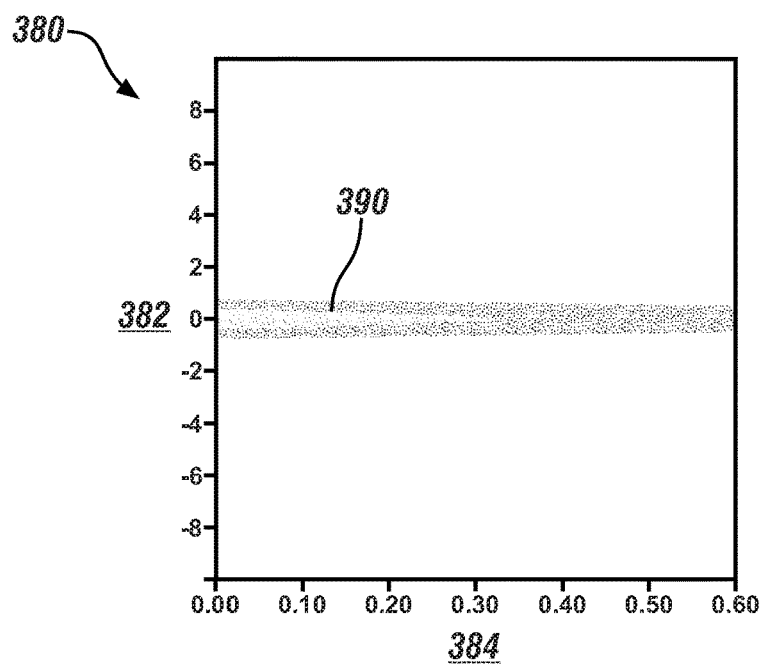
FIG. 6 graphically illustrates a simulated near-field profile of the optical antenna with a length of 0.6 millimeters, in accordance with the disclosure.

FIG. 6 graphically illustrates a simulated near-field profile 380 of the optical antenna 70 with a length of 0.6 millimeters. The simulated near-field profile 380 is illustrated including a vertical axis 382 representing microns and with a horizontal axis 384 representing millimeters. The exemplary results 390 centered upon the vertical axis value of zero include peak values of approximately 2.75e-005 at a left side of the graph with decreasing peak values as values progress to the right side of the graph.

The graph of FIG. 6 shows a gradual outcoupling of light from the antenna as it propagates in the silicon wire waveguide situated below the grating. The intensity of the light outcoupling is strongest in the beginning in such a way that the peak of emission happens not at the first tooth of the grating rather it occurs later on as the light propagates down the antenna inside the silicon wire waveguide. After the light has traversed the entire length of the antenna, a few percent of the light will remain in the silicon wire waveguide, with nearly 88% of the light outcoupling in the top direction and the remaining towards the substrate.

Figure 7:
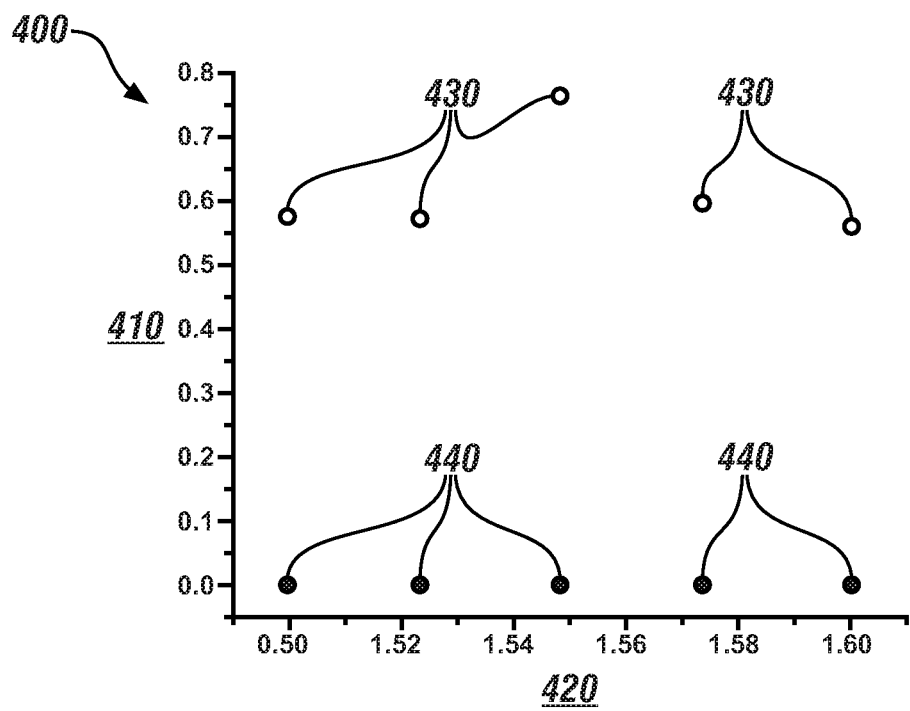
FIG. 7 graphically illustrates a simulated outcoupling efficiency spectrum of the optical antenna with a length of 0.6 millimeters, in accordance with the disclosure.

FIG. 7 graphically illustrates a simulated outcoupling efficiency spectrum of the optical antenna 70 with a length of 0.6 millimeters. Graph 400 is illustrated including a vertical axis 410 representing efficiency (represented as a fractional value, with 1.0 representing 100% efficiency) and a horizontal axis 420 representing wavelength of transmitted light in nanometers. Values of reflection efficiency 440 and values of outcoupling efficiency 430 are provided.

Graph 400 illustrates that the optical antenna 70 that has been optimized to operate at the wavelength of 1550 nanometers and exhibits high coupling efficiency of 76% while the reflection remains low at 0.3%.

Figure 8:
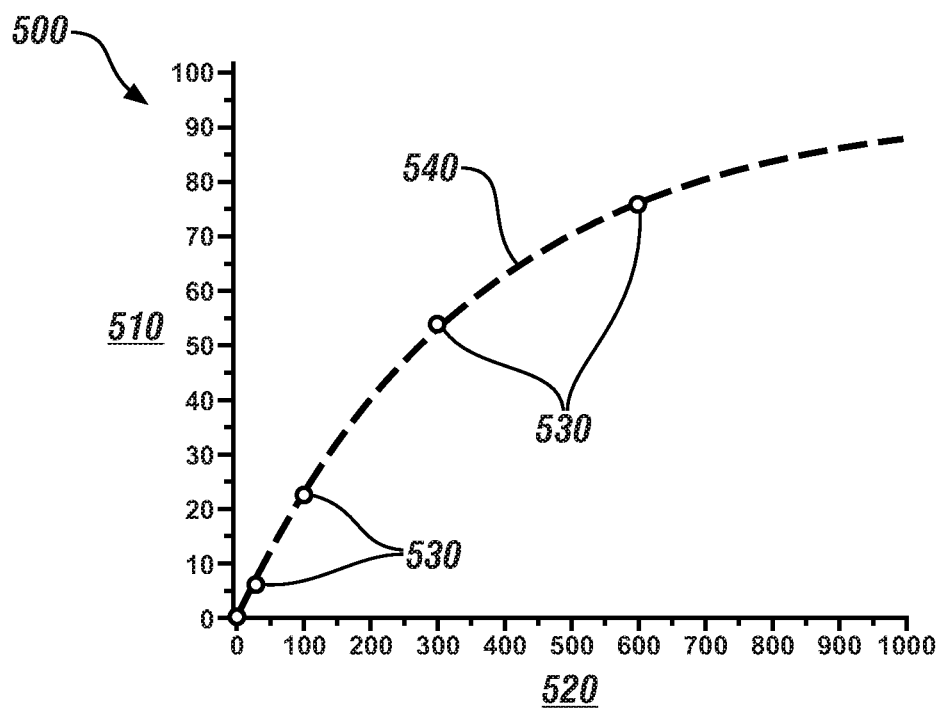
FIG. 8 graphically illustrates simulated antenna efficiency of the optical antenna with varying length of the optical antenna, in accordance with the disclosure.

FIG. 8 graphically illustrates simulated antenna efficiency of the optical antenna 70 with varying length of the optical antenna 70. Graph 500 is illustrated including a vertical axis 510 representing outcoupling efficiency (represented as a percentage value) and a horizontal axis 520 representing length of the optical antenna 70 in micrometers. Values of outcoupling efficiency 530 are provided. An estimated efficiency curve 540 is provided fit to the values of outcoupling efficiency 530. Graph 500 includes values that predict 88% for the optical antenna 70 which has a length of 1.0 millimeter.

The etchings 210 in the grating layer 202 are non-uniform, in that their width in the longitudinal direction of the OPA varies along a length of the OPA. As a result, back reflection of light within the OPA is reduced and outcoupling efficiency is increased. The etchings 210 in a series of side-by-side optical antennas 70 may be duplicated and aligned to each other, such that the etchings 210 match across the series of optical antennas 70. This duplication and alignment of the etchings 210 reduces processing load and scattering effect.

Figure 9:
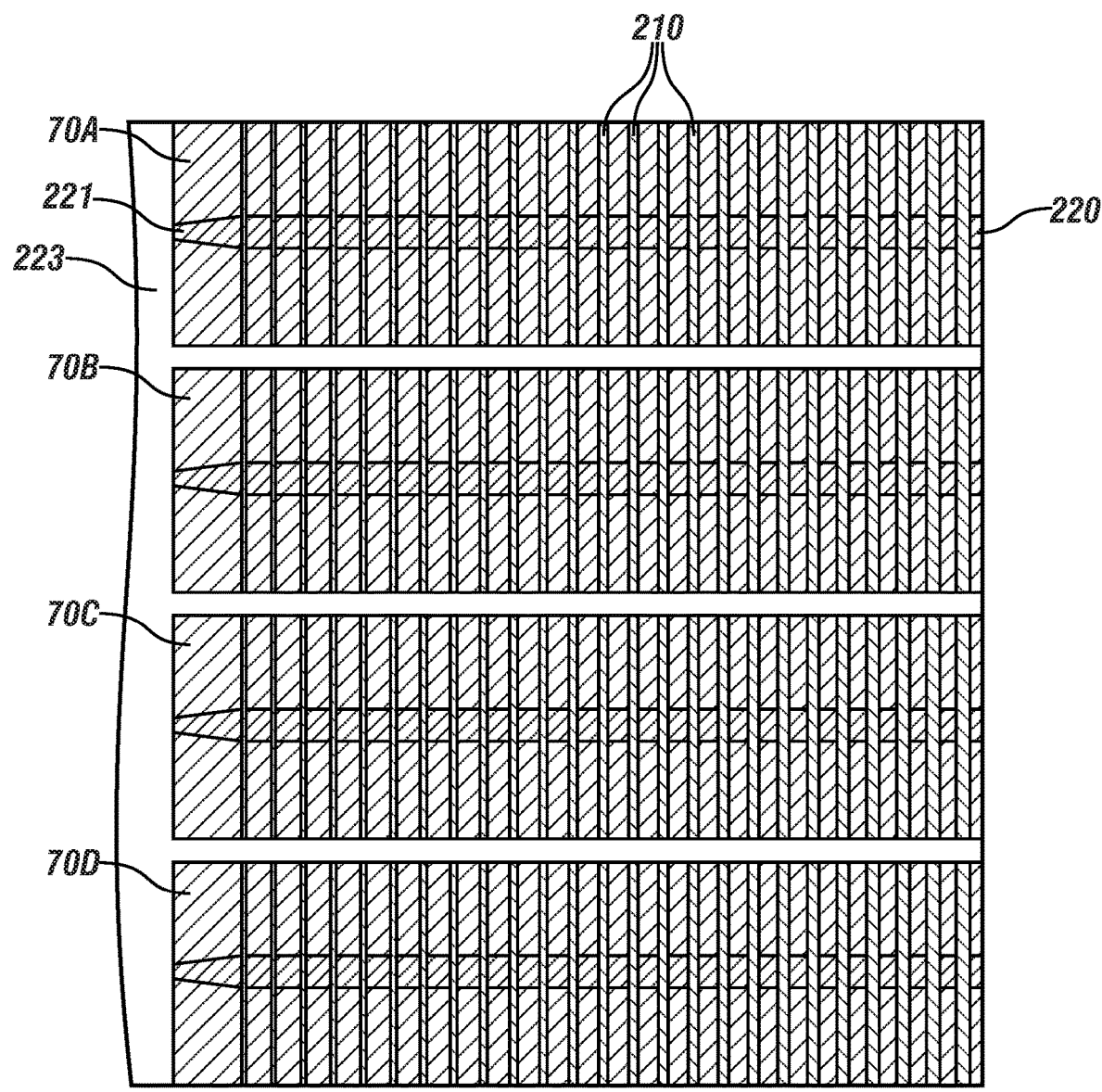
FIG. 9 schematically illustrates a plurality of optical antennas in a top view upon a single semiconductor device, wherein etchings of the plurality of optical antennas are aligned with each other, in accordance with the disclosure.

FIG. 9 schematically illustrates a plurality of optical antennas including an optical antenna 70A, an optical antenna 70B, an optical antenna 70C, and an optical antenna 70D in a top view upon a single semiconductor device 223, wherein the etchings 210 of the plurality of optical antennas are aligned with each other. Silicon wire waveguides 220 are illustrated including a tapered section 221. Aligning etchings 210 reduces processing load and scattering effect.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffering and other components, which may be accessed and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide certain functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter may have a discrete value, e.g., either "1" or "0", or may be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An apparatus including a light detection and ranging (LiDAR) antenna of an optical phased array, comprising:
    an optical antenna, including:
        a silicon-on-insulator substrate including a silicon wire waveguide embedded within the silicon-on-insulator substrate; and
        a grating layer disposed over the silicon-on-insulator substrate, the grating layer including:
            a silicon nitride layer coating the silicon-on-insulator substrate and including a plurality of etchings formed in a direction perpendicular to a length of the optical phased array; and
            a silicon oxynitride layer coating the silicon nitride layer and filling the etchings;
    wherein the etchings are relatively thin in the direction of the length of the optical phased array at a first end of the optical antenna;
    wherein the etchings are relatively thick in the direction of the length of the optical phased array at a second end of the optical antenna; and
    wherein the etchings gradually increase in thickness between the first end of the optical phased array and the second end of the optical antenna.

2. The apparatus of claim 1, wherein the etchings include a constant period along the optical phased array.

3. The apparatus of claim 1, wherein the length is between 0.6 millimeters and 1.0 millimeters.

4. The apparatus of claim 1, wherein the silicon wire waveguide includes a width in the direction perpendicular to the length of the optical phased array of between 450 nanometers and 1500 nanometers.

5. The apparatus of claim 1, wherein the silicon wire waveguide includes tapers from a width in the direction perpendicular to the length of the optical phased array of 450 nanometers to a width in the direction perpendicular to the length of the optical phased array of 1500 nanometers.

6. An apparatus including an optical phased array including a light detection and ranging (LiDAR) antenna, comprising:
    the optical phased array including an optical antenna, including:
        a silicon-on-insulator substrate including a silicon wire waveguide embedded within the silicon-on-insulator substrate; and
        a grating layer disposed over the silicon-on-insulator substrate, the grating layer including:
            a silicon nitride layer coating the silicon-on-insulator substrate and including a plurality of rectangular etchings formed in a direction perpendicular to a length of the optical phased array; and
            a silicon oxynitride layer coating the silicon nitride layer and filling the rectangular etchings;
    wherein the rectangular etchings are relatively thin in the direction of the length of the optical phased array at a first end of the optical antenna;
    wherein the rectangular etchings are relatively thick in the direction of the length of the optical phased array at a second end of the optical antenna; and
    wherein the rectangular etchings gradually increase in thickness between the first end of the optical phased array and the second end of the optical antenna.

7. The apparatus of claim 6, wherein the optical phased array further includes a plurality of optical antennas.

8. The apparatus of claim 7, wherein the rectangular etchings of the plurality of optical antennas are aligned.

9. The apparatus of claim 8, wherein the rectangular etchings include a constant period along the optical phased array.

10. The apparatus of claim 7, wherein a first portion of the plurality of optical antennas are operable as transmit optical antennas; and
wherein a second portion of the plurality of optical antennas are operable as receive optical antennas.

11. The apparatus of claim 6, wherein the plurality of rectangular etchings includes trenches formed in the silicon nitride layer.

12. The apparatus of claim 6, wherein the a length is between 0.6 millimeters and 1.0 millimeters.

13. The apparatus of claim 6, wherein the silicon wire waveguide includes a width in the direction perpendicular to the length of the optical phased array of between 450 nanometers and 1500 nanometers.

14. The apparatus of claim 6, wherein the silicon wire waveguide includes tapers from a width in the direction perpendicular to the length of the optical phased array of 450 nanometers to a width in the direction perpendicular to the length of the optical phased array of 1500 nanometers.

15. A system including a light detection and ranging (LiDAR) system including an optical phased array including a LiDAR antenna, comprising:
a laser;
a transmit optical splitter;
an optical circulator;
a photodetector; and
the optical phased array including an optical antenna, including:
a silicon-on-insulator substrate including a silicon wire waveguide embedded within the silicon-on-insulator substrate; and
a grating layer disposed over the silicon-on-insulator substrate, the grating layer including:
a silicon nitride layer coating the silicon-on-insulator substrate and including a plurality of rectangular etchings formed in a direction perpendicular to a length of the optical phased array; and
a silicon oxynitride layer coating the silicon nitride layer and filling the rectangular etchings;
wherein the laser, the transmit optical splitter, the optical circulator, the photodetector, and the optical phased array are arranged as a chip-scale package on a single semiconductor device;
wherein the laser generates a first light beam that is transmitted to an aperture of the optical phased array via the transmit optical splitter, the optical circulator, and the optical phased array;
wherein the first light beam is transmitted to the photodetector via the transmit optical splitter;
wherein the aperture of the optical phased array captures a second light beam that is transmitted to the photodetector via the optical phased array and the optical circulator;
wherein the rectangular etchings are relatively thin in the direction of the length of the optical phased array at a first end of the optical antenna;
wherein the rectangular etchings are relatively thick in the direction of the length of the optical phased array at a second end of the optical antenna; and
wherein the rectangular etchings gradually increase in thickness between the first end of the optical phased array and the second end of the optical antenna.

16. The system of claim 15, wherein the optical phased array further includes a plurality of optical antennas, wherein the rectangular etchings of the plurality of optical antennas are aligned.

17. The system of claim 16, wherein the rectangular etchings include a constant period along the optical phased array.

18. The system of claim 16, wherein a first portion of the plurality of optical antennas are operable as transmit optical antennas; and
wherein a second portion of the plurality of optical antennas are operable as receive optical antennas.

19. The system of claim 15, wherein the silicon wire waveguide includes tapers from a width in the direction perpendicular to the length of the optical phased array of 450 nanometers to a width in the direction perpendicular to the length of the optical phased array of 1500 nanometers.

* * * * *